United States Patent [19]
Brewer et al.

[11] Patent Number: 5,918,016
[45] Date of Patent: Jun. 29, 1999

[54] SYSTEM WITH PROGRAM FOR AUTOMATING PROTOCOL ASSIGNMENTS WHEN NEWLY CONNECTED TO VARING COMPUTER NETWORK CONFIGURATIONS

[75] Inventors: Jason M. Brewer, Dallas; John C. Linn, Richardson; Keith L. Perrin, Houston; Robert E. Tonsing, Troy, all of Tex.

[73] Assignee: Texas Instruments Incorporated, Dallas, Tex.

[21] Appl. No.: 08/872,466

[22] Filed: Jun. 10, 1997

[51] Int. Cl.$^6$ .................................................. G06F 17/00
[52] U.S. Cl. ................................... 395/200.5; 395/200.72
[58] Field of Search ........................... 395/200.5, 200.57, 395/200.59, 200.33, 200.68, 200.72, 200.52, 200.36; 455/31.2, 11.1; 370/312, 338, 401

[56] References Cited

U.S. PATENT DOCUMENTS

| | | | |
|---|---|---|---|
| 5,159,592 | 10/1992 | Perkins | 370/401 |
| 5,412,654 | 5/1995 | Perkins | 455/11.1 |
| 5,493,692 | 2/1996 | Theimer et al. | 395/200.36 |
| 5,557,748 | 9/1996 | Norris | 395/200.52 |
| 5,655,148 | 8/1997 | Richman et al. | 395/831 |
| 5,696,903 | 12/1997 | MAhanny | 395/200.58 |
| 5,790,800 | 8/1998 | Gauvin et al. | 395/200.57 |
| 5,809,329 | 9/1998 | Lichtman et al. | 395/835 |
| 5,812,531 | 9/1998 | Cheung et al. | 370/401 |
| 5,812,819 | 9/1998 | Rodwin et al. | 395/200.5 |

*Primary Examiner*—Ellis B. Ramirez
*Attorney, Agent, or Firm*—Ronald O. Neerings; William B. Kempler; Richard L. Donaldson

[57] ABSTRACT

A method of configuring a mobile computer (H3) among different computer network configurations (N1, N2). In this method, the mobile computer is connected (18) to a first network medium in various steps. In one step, a network interface circuit (NIC) of the mobile computer is coupled to communicate with the first network medium. In another step, the mobile computer is configured to have an IP address allocated for the first network medium. Next, there is the step (20) of performing a program operation on the mobile computer to determine whether a dynamic configuration protocol is available on the first network medium. Another step performs a program operation to store an indicator in a storage resource of the mobile computer representing whether a dynamic configuration protocol is available on the first network medium. Next, the mobile computer is disconnected (22) from the first network medium, including uncoupling the network interface circuit of the mobile computer from communicating with the first network medium. Next, the mobile computer is connected (24) to a second network medium, including coupling the network interface circuit of the mobile computer to communicate with the second network medium, and performing a program operation on the mobile computer to request a user interface input. In response to the user interface input, the method performs a program operation to store (29) the IP address allocated for the first network medium in a persistent storage resource included within the mobile computer if the indicator indicates that a dynamic configuration protocol is not available on the first network medium. Also in response to the user interface input, the method performs a program operation on the mobile computer to configure (32) the mobile computer to have an IP address allocated for the second network medium by transmitting along the second network medium the IP address allocated for the second network medium from a server computer to the mobile computer.

23 Claims, 3 Drawing Sheets

SYSTEM WITH PROGRAM FOR AUTOMATING PROTOCOL ASSIGNMENTS WHEN NEWLY CONNECTED TO VARING COMPUTER NETWORK CONFIGURATIONS

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer systems, and are more particularly directed to a system with program for automating protocol assignments when newly connected to varying computer network configurations.

Data communication is now a key part of modern computing and is available over a wide variety of networks. This data communication may be used for various reasons, such as business, science, personal, or entertainment. The various media to communicate data between users also has proliferated. Such media include both local area networks (LANs) as well as wide area networks (WANs). There is likely no clear formal line between the definition of a LAN or a WAN, but it is generally accepted that a LAN is for more local communication of data such as within a small location, building, or complex, while a WAN is for communication of data across a greater distance which may be across a nation or even worldwide. In any event, the existence of networks for purposes of data communication is now very popular, and appears to be a way of life for the foreseeable future.

Another trend in the field of computers has been mobility. Specifically, various types of mobile computers are now quite popular, such as notebooks, laptops, and even handheld computer devices which often operate based on scaled-down versions of contemporary operating systems and execute scaled-down versions of contemporary application programs. For each of these device types, its increased use and popularity has spanned newer industries and also appears to represent a common manner of conducting business and personal computing in the future.

Given the above, there is now an overlap of these concepts, that is, data communication among networks and the use of mobile computers. Particularly, a mobile computer user may now desire to move the computer from one network to another, and therefore have the ability to communicate with each different computer network. For example, a computer user may have a notebook computer connected to a LAN in his or her office, and the user may take that computer with them on business to a different facility with a different LAN. As another example, the same user may move their notebook computer to a different LAN within the same facility, such as by attending a meeting in a conference room or the like which has its own network, where that network may be further connected via a gateway or other mechanism to still other networks.

With the desire to move computers as discussed above, numerous complexities arise as are recognized by one skilled in the art. However, of particular consideration to appreciate the inventive embodiments described below, note that under many current operating systems, such as the WINDOWS 95 operating system provided by MICROSOFT, a user of a mobile computer as described above may require particularized and somewhat complicated knowledge to accomplish successful moves of the mobile computer, or may require access to a person such as a computer systems administrator to provide such knowledge. For example, under the current WINDOWS 95 operating system, when a computer is connected via a hardware interface to a network, a sophisticated user is aware that various user inputs must be provided so that the user's computer may effectively operate using the newly-connected network. In this regard, the user is required to have sufficient familiarity to bring up certain menus and options so as to input the information, and also of course requires sufficient knowledge of various attributes of the newly connected network and its resources in order to input this information in response to those menus and options.

One type of input typically required of a user when connecting its computer to a network is a configuration for the computer to communicate with the network protocol. One considerably prolific network protocol is known in the art as IP (internetwork protocol). Often the IP is mentioned as part of TCP/IP; however, TCP/IP is actually a combination of the two standards used in the protocol. The first protocol is TCP which is an abbreviation for transport control protocol. The second protocol is the IP introduced above. Although the name TCP/IP combines these two standards, in actuality the standards are implemented in an ordered level manner such that the TCP protocol is closer to the application level and the IP protocol is closer to the physical network connection level. In any event, TCP/IP is well known and permits packets of information to be sent and received along different types of networks. For detailed information on TCP/IP, the reader may find numerous contemporary and commercially available publications, such as "Intenetworking With TCP/IP," Volumes I through III, by Douglas E. Comer, Third Edition (1995 by Prentice Hall), which is hereby incorporated herein by reference.

Under the IP protocol, there are various settings which are either required or often used when configuring a computer to communicate with a network. For example, one of the required settings is an IP address which, as known in the art, uniquely distinguishes the computer from other computers connected to the same network. As another example of an IP setting, there is a subnet mask. This mask is used in combination with the IP address for certain intenetwork communications, that is, the passing of information from the network to which the computer is connected to a different network. As yet another IP setting example, a default gateway is also often included with the IP configuration, where this identifies a computer which operates as a gateway to a different network. Lastly, the IP setting may include an IP address of machines which provide name services.

Given the various IP settings, note how they are implicated in the earlier notion that a user may be required to have particular knowledge to configure his or her computer. Specifically, under the current art, there are both static IP networks and dynamically configurable IP networks, where each presents a manner in which the computer is provided its IP settings. Note also that each of these techniques under the current art requires various actions and, therefore, various levels of sophistication, by the user or the person configuring the computer for the user. To better appreciate these considerations, each of the static IP and dynamically configurable IP networks is discussed separately, below.

As introduced above, a static IP network presents one type of environment for establishing the IP settings for a computer connected to such a network. In the static IP network, a computer user is required to manually input the IP settings to the computer. Therefore, first the user must know that this action is required of him or her. Second, the user must be aware of how to bring up the required menus and input screens to be able to input the information. Still further, once the appropriate input screens are reached, the user must be aware of the setting information, such as the IP address, the subnet mask, the default gateway, and the IP address of one or more computers providing name services. Consequently, the user must be fairly savvy to possess such knowledge. In addition, if the user later moves the computer from the first network to a second network, then this static information is overwritten by the IP settings of the different network. Therefore, the user is required to reconfigure the computer once again when returning to the first network. As one approach, the user is required to remember the IP settings or otherwise note them somewhere and then re-input those settings into the computer. As another approach which may be used in limited circurnstances, there is currently a software product on the market known as "IP switch", where this product allows the user to store two different sets of IP settings in the computer, and attribute each of those sets to a different type of network interface circuit. Thereafter, once the user connects to a network, he or she may run the software product and choose one of two types of network interface circuits, thereby selecting the static IP settings corresponding to the chosen network interface circuit. This approach only assists the user if the second network requires a different type of hardware interface when connecting to it as opposed to the first network. Also, this approach requires that at least initially the user manually input both of the two sets of IP settings. In any event, therefore, there are clear complexities involved to a user who disconnects its computer from a static IP network to connect it to a different network, and then to later return to the original static IP network.

Also as introduced above, a dynamically configurable IP network presents another type of environment for establishing the IP settings for a computer connected to such a network. One commonly implemented dynamically configurable IP network is known as the dynamically host configurable protocol, or "DHCP". In a DHCP network, a computer user is not required to manually input the IP settings to the computer, but there are other complexities imposed on the user for properly configuring the computer to the network. Again, first the user must know that various actions are required of him or her, and these actions are required to properly disconnect from one DHCP network and also to properly connect to a different DHCP network. Once again, the user must be aware of how to bring up the required menus. For example, for a user to properly disconnect from a DHCP network, then the user must physically uncouple the hardware from the network but is further required to "release" the DHCP "lease" given to the computer. This latter action may be accomplished in two manners. As a first approach such as is used under the WINDOWS 95 operating system, the user may bring up the appropriate input window and click a release button in that window. As a second approach in other operating systems, the user may power down the computer and, provided that power down properly occurs, the DHCP lease will be released. As to this latter approach, however, note that errors in the power down sequence may occur, thereby preventing the release from occurring. Once again, therefore, the user must be fairly savvy to possess sufficient knowledge of the required activities. In addition, if the user then moves the computer from the first network to a second network, the user is then required to "renew" a DHCP lease from the next network (assuming the next network is also a DHCP network). Note, however, that renewal first requires that a proper release occurred with respect to the prior DHCP network. For example, if the user powered down the computer to obtain a release, but that power down did not occur in the proper manner, then it may be that renewal cannot be achieved because the release has not yet occurred. In any event, assuming a proper release has occurred, renewal also may be accomplished in one of two manners. First, the user may bring up the appropriate input window and click a renew button in that window. Second, the user may power up the computer after having connected it to the second network. In either event, once again the user must possess certain knowledge to accomplish these many steps to ensure they occur properly.

In view of the above, as networks grow even more in popularity and also as the mobility of computers increases, there arises a need to permit the combination of these technologies to be more user-friendly and accommodate at least in certain circumstances either less sophisticated users or users who do not have access to other persons who may advise the user regarding the combination of network and mobility technologies. The present embodiments are directed at such needs, and arise specifically in the context of moving a computer from a base network to other foreign networks, as detailed below.

BRIEF SUMMARY OF THE INVENTION

In the preferred embodiment, there is a method of configuring a mobile computer among different computer network configurations. In this method, the mobile computer is connected to a first network medium in various steps. In one step, a network interface circuit of the mobile computer is coupled to communicate with the first network medium. In another step, the mobile computer is configured to have an IP address allocated for the first network medium. Next, there is the step of performing a program operation on the mobile computer to determine whether a dynamic configuration protocol is available on the first network medium. Another step performs a program operation to store an indicator in a storage resource of the mobile computer representing whether a dynamic configuration protocol is available on the first network medium. Next, the mobile computer is disconnected from the first network medium, including uncoupling the network interface circuit of the mobile computer from communicating with the first network medium. Next, the mobile computer is connected to a second network medium, including coupling the network interface circuit of the mobile computer to communicate with the second network medium, and performing a program operation on the mobile computer to request a user interface input. In response to the user interface input, the method performs a program operation on the mobile computer to store the IP address allocated for the first network medium in a persistent storage resource included within the mobile computer if the indicator indicates that a dynamic configuration protocol is not available on the first network medium. Also in response to the user interface input, the method performs a program operation on the mobile computer to configure the mobile computer to have an IP address allocated for the second network medium by transmitting along the second network medium the IP address allocated for the second network medium from a server computer to the mobile computer. Other systems and methods are also disclosed and claimed.

DETAILED DESCRIPTION OF THE INVENTION

Figure 1:
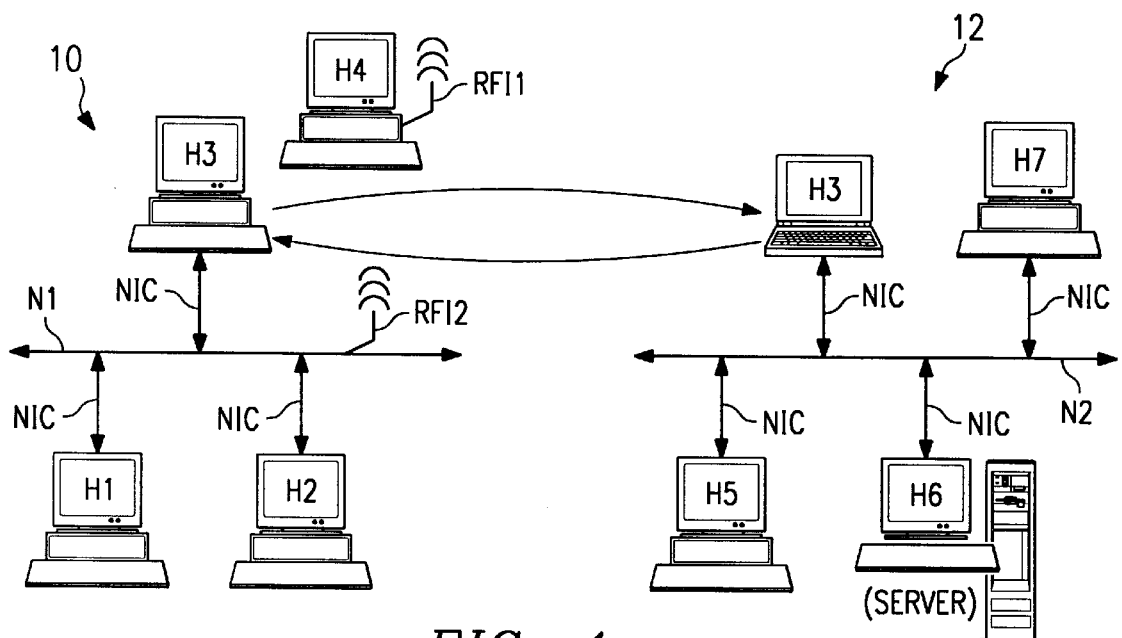
FIG. 1 illustrates a computer configuration with a first and second network, with each network configured to communicate with a corresponding group of host computers, where one of those host computers is moved from one of the networks to the other network.

FIG. 1 illustrates two computer configurations, a first designated generally at 10 and a second designated generally at 12, where both configurations together demonstrate an aspect of mobility in accordance with the present inventive embodiments. Computer configuration 10 includes a computer network N1, and computer configuration 12 includes a computer network N2. Each of these networks has a number of host computers coupled to the corresponding network. As detailed below, the present embodiments involve the movement of any one of such computers from one network to the other network. Thus, arrows are generally shown between N1 and N2 in a circular manner to represent the possibility of moving a computer back and forth between these networks. Moreover, the configurations of FIG. 1 are only by way of example, and other or additional networks could be involved as well. Each of the networks and the computers coupled to it are described below. In this regard, in the general sense described immediately below configurations 10 and 12 are the same as in the prior art. However, as detailed later in connection with the mobility of a host computer between the networks, the operation of a program on the mobile computer with respect to configurations 10 and 12 provides inventive aspects with benefits over the prior art. Thus, below is first provided an overview of configurations 10 and 12 with a subsequent discussion directed toward the inventive scope.

Turning to a description of network N1 of configuration 10, as is known in the art it includes a number of host computers which by way of example in FIG. 1 is four host computers designated as H1 through H4. Each of host computers H1 through H4 is coupled via a corresponding network interface circuit ("NIC") to computer network N1. Thus, host computers H1 through H4 may be of any type of computer device with sufficient hardware and software to couple to, and communicate with, network N1. Moreover, with regard to the coupling, note that the NIC connection of host computers H1 through H3 are physical connections between the computer and the network. Alternatively, note that host computer H4 is not physically connected to network N1. Instead, the NIC of host computer H4 includes a radio frequency interface RFI1 which is operable to transmit and receive communications to and from a radio frequency interface RFI2 connected to network N1. Note further that the radio frequency interface RFI2 (or a similar radio frequency interface) could be connected to one of the host computers which is physically connected to N1 rather than having RFI2 connected directly to network N1.

Turning to a description of network N2 of configuration 12, as is known in the art it includes a number of host computers which by way of example in FIG. 1 is also four host computers. Three of those host computers include H5 through H7. However, recall it is earlier stated that the present embodiments relate in various respects to the movement of a computer between networks. Thus, in FIG. 1 note that host computer H3 is also shown coupled to network N2. As better appreciated later, this connection is intended to indicate that host computer H3 is at some time disconnected from network N1 and then connected to network N2. As in the case of network N1, each of host computers H3 and H5 through H7 is coupled to network N2 via a corresponding NIC. Once again, therefore, host computers H5 through H7 may be any type of computer device with sufficient hardware and software to couple to, and communicate with, network N2. Lastly, note that each of the host computers coupled to network N2 is actually physically connected to network N2, but one or more radio frequency types of couplings could be used either in addition to, or in lieu of, the couplings shown in FIG. 1.

Both networks N1 and N2 represent any of various types of networks where several are known in the art, and the appropriate hardware interface for connecting each of the host computers to the network is also known in the art and depends on the network type. For example, networks N1 and N2 may be Ethernet networks as developed in the early 1970s, and which have become quite popular and varied in form (e.g., original coax, thin-wire Ethernet, twisted pair) since that time. In addition to variation in network type, either or both of configurations 10 and 12 of FIG. 1 may apply to various network sizes. For example, such network sizes may include smaller environment LANs such as in a single conference room, or larger LANs as well. Still further, note also that the reach of either or both of networks N1 and N2 of FIG. 1 may span far greater distances, such as within an entire building, between buildings or even beyond and, therefore, the present embodiments may find use in the context of WANs as well.

Having described the general setup of networks N1 and N2 with respect to aspects known in the art, reference is now made to some observations regarding how the inventive scope includes functionality which improves the ability to move a computer between those or similarly situated networks. Again, for the remainder of this document, the example of moving host computer H3 between the networks is used, with one skilled in the art readily appreciating how the present embodiments may apply to other host computers as well. As an example to demonstrate various aspects of the present embodiments, assume that network N1 is the network to which the user of host computer H3 is most often coupled. Thus, the user may tnink of network N1 as the "base" network. Moreover, and in contrast, assume that network N2 is one to which the user of host computer H3 desires to temporarily move host computer H3 so as to communicate with the other host computers coupled to network N2. In this regard, therefore, the user of host computer H3 may think of network N2 as a "foreign" network. Consequently, under the present embodiment, the user of host computer H3 will have a notion of a "base" network, as well as one or more "foreign" networks. The purpose of this association is more readily apparent from the functional descriptions of additional aspects described below.

Given the above overview of configurations 10 and 12 of FIG. 1, for purposes of discussing the inventive aspects in this document note that host computer H3 is programmed to be automatically configured to properly communicate with either its base network (i.e., N1) or a foreign network (e.g., N2) with minimal burden and sophistication required of its user. This program may be stored in the memory of host computer H3, such as by reading the program into that memory from some type of storage such as a hard drive storage, floppy diskette, or still other types of storage devices as ascertainable by one skilled in the art. In any event, FIG. 3, below, demonstrates the detailed steps involving this program and the steps of moving host computer H3 from its base network to a foreign network, while FIG. 5 demonstrates the detailed steps involving this program and in moving host computer H3 from a foreign network either back to the base network or to yet another foreign network (i.e., another network different than the base network). Before proceeding with a detailed discussion of these steps, two additional and related observations are noteworthy to better appreciate certain inventive aspects. Each of these observations is discussed below.

Figure 2:
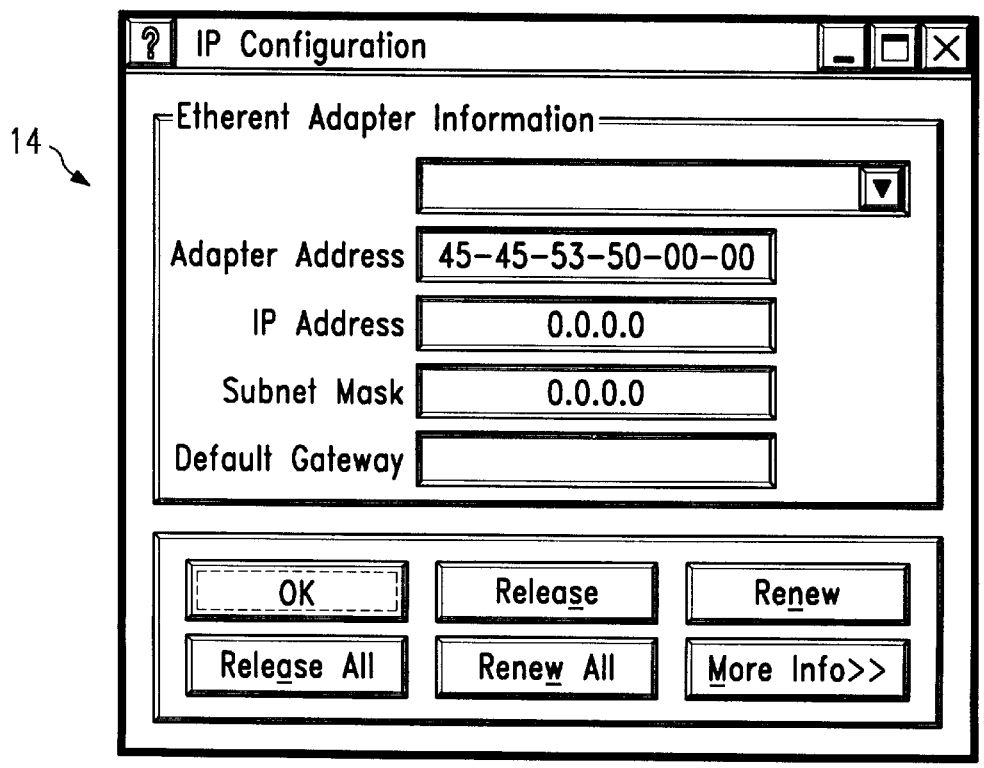
FIG. 2 illustrates a prior art WINDOWS 95 window with respect to the IP configuration for a computer for either dynamic or static entry of the settings for that configuration.

A first introductory observation to the present embodiments involves the initial configuration of host computer H3 with respect to its base network (i.e., network N1). Specifically, it is assumed that, prior to reaching FIG. 3, host computer H3 is initially configured with IP settings to communicate with the base network N1 where this configuration may be accomplished in a manner known in the art. The IP settings preferably include an IP address assigned to host computer H3, a subnet mask, possibly a default gateway, and also possibly an IP address(es) of one or more machines which provide name services (e.g., DNS, NetBIOS, or WINS). The manner in which this information is provided to host computer H3 with respect to its base network depends in part on whether that base network includes a dynamically provided protocol, such as DHCP. In the instance where the base network is statically configured and is using WINDOWS 95, the user may used the Control Panel (Network) to enter the appropriate static IP information. In the instance where the base network is dynamically configured, and in the instance of WINDOWS 95, the user may locate the file named "winipcfg" under the windows folder and open that file to configure host computer H3. In this regard, FIG. 2 illustrates a graphic which is typical of a prior art window 14 presented to a user when the file "winipcfg" is opened. If network N1 has DHCP, then the user of host computer H3 may configure the IP settings of the computer by clicking the "Release" button and thereafter clicking the "Renew" button. The former activity will end (or "release") any earlier DHCP settings while the latter activity will cause new settings to be transmitted along network N1 to host computer H3 (i.e., will "renew" the settings). Note also that it is assumed where DHCP is used that one of the other host computers coupled to network N1 operates as a DHCP server to provide this information. If network N1 does not have DHCP, then the user of host computer H3 must configure the IP settings of the computer by manually entering the IP address and subnet mask (and possibly also the default gateway) to window 14 shown in FIG. 2.

A second introductory observation to the present embodiments involves the subsequent configuration of host computer H3 after it is disconnected from the base network N1. As demonstrated below, the present embodiment provide a level of automation in the configuration process so that the user of the computer (e.g., host computer H3) being moved among networks is required to perform a minimal amount of action to re-configure the computer for each different network. As noted earlier, the mobility of the computer may be to one or more other foreign networks, or back to the base network at any time. Also as noted earlier, the IP configuration on the base network may be either static or dynamic. However, note now that in the following embodiments it is assumed that each of the foreign networks is dynamically configurable. Therefore, each foreign network is expected to have a dynamic technique, such as the inclusion of a DHCP server, which upon proper commands may transmit an IP configuration to the newly connected computer. Given this assumption and returning briefly to FIG. 1, note that network N2, which is assumed to be a foreign network, includes a DHCP server computer (i.e., host computer H6). Thus, network N2 has the ability to dynamically provide IP configurations for reasons more clear below. Lastly, note that DHCP is used as an example of a technique for dynamically providing IP configurations, while other examples may be used in lieu of that standard. For example, in an alternative inventive embodiment, a host computer may be included on a foreign network where it is known that the network will not be connected to other networks. In this case, some of the DHCP rules may be relaxed. For example, for a given network which may be connected to another network, there are known stringent requirements about the assignment of IP addresses which are not only unique on the given network, but are also unique to any other network to which the unique network is attached. However, if it is known that the given network will not be connected to another network, then an inventive approach may include a host computer to be used as a server of IP addresses where those addresses need only be unique for that given network. In any event, it is assumed that each foreign network used in accordance with the present embodiments provides some ability whereby a computer on the foreign network may transmit at least an IP address and a subnet mask, and preferably also a default gateway and also possibly an IP address of machines which provide name services, to a computer which is newly coupled to that foreign network.

Figure 3:
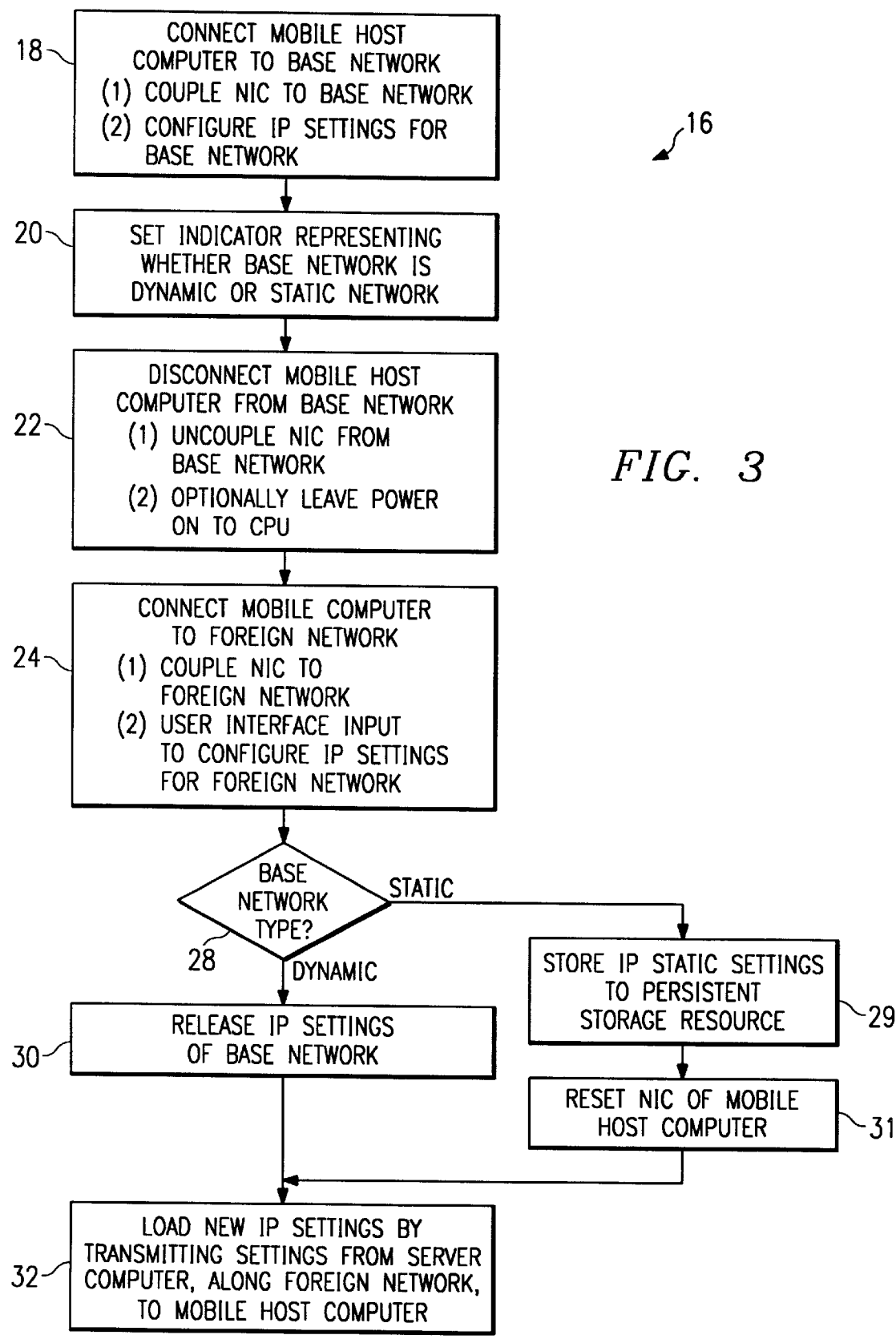
FIG. 3 illustrates a flowchart of the preferred steps of moving a mobile computer from a base network to a foreign network.

FIG. 3 illustrates a flowchart of a method 16 which indicates the operations of connecting host computer H3 first to network N1, and thereafter moving it to network N2. For purposes of the remaining discussion, therefore, host computer H3 is referred to in FIG. 3 (and FIG. 5) as a "mobile host computer" due to the mobility of the computer between a base network and a foreign network. Turning to method 16, in step 18 host computer H3 is connected to the base network (i.e., network N1). As a first part of this step, the NIC of host computer H3 is coupled to communicate with network N1. In the illustration of FIG. 1, the NIC of host computer H3 involves a physical connection and, thus, in step 18 the user of host computer H3 completes the appropriate physical connection between the computer and network N1. Alternatively, however, a radio interface or other type of NIC could be involved in accomplishing step 18 if host computer H3 were to include such an interface. As a second part of step 18, host computer H3 is configured with the appropriate IP settings to communicate with network N1. As mentioned in connection with FIG. 2, above, the actions taken for this step depend on whether the IP settings are dynamically available on network N1, or whether those settings are static. In either event, the reader is referred to the earlier discussion for each of these two alternatives.

Step 20 represents a step of method 16 which, in the preferred embodiment, is accomplished by programming host computer H3 to accomplish the step. Moreover, step 18 as well as additional steps described below may be accomplished by including one or more programs on host computer H3 so as to accomplish the described functionality.

These programs may include operations at both the application level as well as lower level operations such as at the protocol level, and are readily implemented by copying the code to perform the program steps to the appropriate memory or other storage within the computer so that the steps may be achieved according to the computer program. In any event, one skilled in the art may readily appreciate the implementation of the functionality of the present embodiments so that the operations are accomplished by running the appropriate program code on the computer at issue. Looking specifically to step 20, the program executed on host computer H3 sets an indicator which represents whether the base network (i.e., network N1) is either a dynamic or static network with respect to establishing IP settings for computers coupled to the network. In the preferred embodiment, this setting is stored in a persistent memory, meaning in a storage resource where the information is recoverable regardless of whether power to the computer is turned off and then back on. Thus, such storage may be on a hard drive or the like and, therefore, may provide the information later for reasons discussed below. Additionally, the manner of performing step 20 depends on a given architecture. For example, in the context of the defined commands for DHCP, step 20 may be accomplished by host computer H3 issuing a "discover" command to network N1. As known in the DHCP art, a discover command is a broadcast response to determine whether a network includes a DHCP server. Therefore, if a "reply" is received in response to the discover command, step 20 may record in its indicator that the base network is a dynamically configurable network (in the sense of IP settings). On the other hand, if no reply is received in response to the command, step 20 may record in its indicator that the base network is a static configurable network. Still other approaches to making this determination may be ascertained by one skilled in the art.

In step 22 the user of host computer H3 disconnects it from the base network. In the preferred embodiment, step 22 is accomplished when the user uncouples the computer from the network. Thus, where a physical NIC is used for the coupling (such as shown in FIG. 1 with respect to host computer H3), then step 22 is performed by the user physically disconnecting the NIC from the network. On the other hand, if a radio NIC is used for the coupling, then step 22 is performed accordingly, such as by removing the radio transmitting/receiving card from the computer or by moving the computer with the radio NIC a sufficient distance away from the radio network so that the radio NIC is no longer within the communication radius of the network (i.e., thereby ending the ability of the radio NIC to communicate with the radio network). FIG. 3 also indicates that step 22 may be performed while leaving host computer H3 turned on. Note this differs with the prior art approach sometimes taken when disconnecting from a DHCP network; in other words, it is stated earlier that one prior art technique for disconnecting from a DHCP network involves turning off the computer, thereby releasing the DHCP lease to the computer (assuming a proper shut down of the computer). However, in contrast, the preferred embodiment permits the computer at issue (e.g., host computer H3) to remain on while disconnecting it from the base network and further while transporting it to, and connecting it to, the foreign network as appreciated below.

Figure 4:
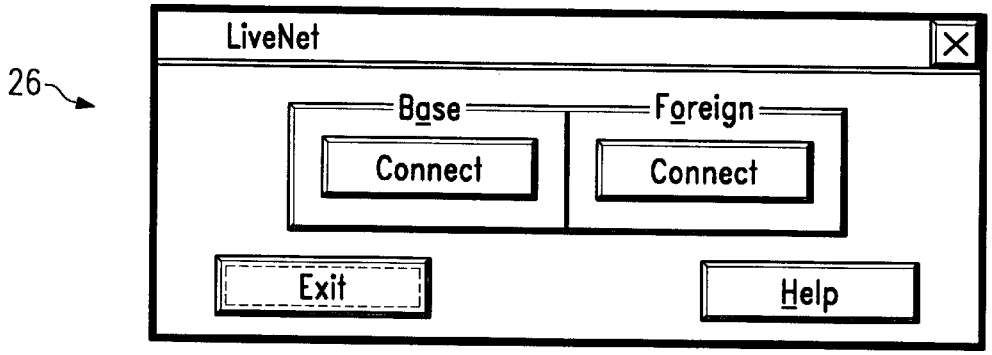
FIG. 4 illustrates a window presented by a program according to the preferred embodiment where the window presents a user interface for the user to commence an automated process to configure the computer for a newly connected network.

In step 24 the user of host computer H3 connects it to the foreign network (e.g., network N2). As a first part of this step, the NIC of host computer H3 is coupled to communicate with network N2. Once again, the example of FIG. 1 involves an NIC in host computer H3 which requires a physical connecting to network N2 (although a different interface could again be used such as a radio frequency interface). As a second part of step 24, host computer H3 is configured with the appropriate IP settings to communicate with network N2. This second part is accomplished again via the program(s) on host computer H3 introduced above with respect to step 20. More specifically, in step 24, the user of host computer H3 brings up a menu or otherwise opens a window such as window 26 as shown in FIG. 4. Turning briefly to FIG. 4, it depicts a window 26 which for purposes of illustration is part of an application program entitled "LiveNet." Therefore, in the preferred embodiment, the user of host computer H3 may access an icon or the like on the computer which, when clicked, opens window 26. In response, window 26 provides the user of host computer H3 with the ability to choose to connect to one of two network types. Recall that step 24 involves the connection of host computer H3 to network N2 which is a foreign network. Therefore, the user clicks on the foreign network "Connect" button of window 26 and, in response, the program otherwise operates host computer H3 to take the additional actions discussed in connection with the remaining steps shown in FIG. 3 following step 24. Thus, in the preferred embodiment, the user is not required to take any additional action in order to configure host computer H3 to communicate with the foreign network.

In step 28, the program on host computer H3 examines the indicator set in step 20 to determine the manner of protocol assignment for the base network. In other words, recall that those assignments were created either dynamically (i.e., communicated to the host computer by another computer on the network) or statically (e.g., by manual user input). If the base network protocol assignment is static, then step 28 passes control to step 29. On the other hand, if the base network protocol assignment is dynamic, then step 28 passes control to step 30. Each of these steps is discussed below.

From the above note that step 29 is reached when the host computers coupled to the base network are statically configured with IP settings. For reasons appreciated later, in step 29 the program on host computer H3 stores the statically-entered IP settings of host computer H3 as those settings pertained to the base network. In the preferred embodiment, these settings may be stored in any type of persistent storage accessible to the mobile host computer, and this storage is chosen so that the stored information will not be unintentionally overwritten by a newer set of IP settings. Therefore, step 29 may save the settings to an addressable location in a non-volatile memory, or some hard storage such as on a hard drive within host computer H3. In any event, the saving operation of step 29 is performed so that later the saved settings may be retrieved even after the computer has been re-configured with a different set of IP settings.

After step 29, method 16 continues to step 31; note then that step 31 is reached when the base network is a statically configured network. Consequently, and in preparation for the new IP settings to be loaded as described with respect to step 32 below, in step 31 the program on host computer H3 resets the NIC of host computer H3. Such an action may be achieved by deleting the NIC software driver and "re-enumerating" (as that term is known in the art) to reinstall the driver with the new configuration, that is, to ready the driver for a dynamic, rather than static, configuration. As an approximation from a software standpoint, this operation powers down and then powers back up the interface connection of host computer H3 to the foreign network. Note, however, that this operation does not disturb power to the central processing unit of host computer H3. Moreover, when power up of the network interface circuit is achieved, new IP settings may be loaded by step 32 as discussed below and to take effect with respect to the configuration of host computer H3 and, therefore, H3 is then operable to communicate along the foreign network using these settings. Thus, after step 31, method 16 continues to step 32, as discussed later after the following discussion of step 30 which, recall, is reached when the IP settings of the base network are dynamically configured.

In step 30, having been reached when the IP settings of the base network are dynamically configured, the program on host computer H3 releases the dynamic settings from the base network. Thus, step 30 effectively automates the process which otherwise may be manually required, such as the process described earlier whereby the user is required to locate the "winipcfg" file under the windows folder, open that file, and enter the settings as discussed earlier. In contrast, therefore, step 30 avoids the necessity for the user having to take such actions and instead permits host computer H3 to take such actions without any requirement or overt indication to the user. Next, method 16 continues to step 32, described immediately below.

In step 32, having been reached for either a statically or dynamically IP configured base network, the program on host computer H3 obtains and stores a set of IP settings allocated for use by a computer coupled to network N2. More specifically, in the preferred embodiment and in response to the click on the foreign network "Connect" button, the program preferably issues a DHCP discover command to network N2. Recall earlier that it is assumed for the present embodiments that each foreign network either has a DHCP server, or at a minimum have some other computer coupled to it which is capable of responding in a meaningful manner to DHCP commands. If this assumption is in error then a reply is not returned to host computer H3 in response to the discover command it issued; instead, in response method 16 presents an error message to the user of host computer H3 indicating that the user is not properly coupled to now communicate with network N2 (as shown in parenthesis in step 24 of FIG. 3). On the other hand, if the assumption is correct (i.e., that a dynamic protocol is available on the foreign network), then the server computer coupled to the foreign network and which provides the dynamic protocol functionality issues a reply command to host computer H3. Next, the program of the preferred embodiment on host computer H3 issues a request command to the server computer, where that request is understood as a request for the server computer to assign to host computer H3 one of the IP addresses allocated for the foreign network. In response, the server computer returns a reply and acknowledge command to H3, where that command includes the assigned IP address for host computer H3, and may further include any of a subnet mask, a default gateway, and an IP address of one or more machines providing name services, also to be added to the IP configuration of host computer H3. Lastly, the program on host computer H3 enters the received item(s) into the appropriate locations of host computer H3 so that those settings thereafter may be used to permit host computer H3 to communicate along the foreign network. In this regard, note that these new settings will supersede any settings from the base network. However, if the base network used statically entered IP settings, recall also that step 29 saved those settings in a separate and now undisturbed storage location so that they subsequently may be retrieved, as is discussed later in connection with FIG. 5 below. Thus, step 32 represents the last step of method 16, thereby completing the configuration of the IP settings of host computer H3 based on the transportation of that computer from its base network to a foreign network.

Having described the various steps of method 16, some concluding remarks are instructive and include some attention to the benefits of the preferred embodiment in contrast to the prior art. For example, note that the user of a computer programmed in accordance with method 16 is able to re-configure a computer from a base network to a foreign network, where the IP protocol on the base network is either dynamically or statically assigned, and where the user can achieve this action by the click of a single user interface input (e.g., a single button on window 26 of FIG. 4). As another example, note that the user is able to achieve the re-configuration without having to reset the transported computer. In other words, recall that in some instances the prior art requires the user to re-boot the computer, such as by powering off the computer. In contrast, however, the preferred embodiment affects only the software component of the NIC of the transported computer so that power is not disturbed to the central processing unit of that computer; consequently, it also is not necessary to re-boot the transported computer or otherwise reset or re-start its operating system once it is connected to the foreign network. Still other examples will be appreciated by one skilled in the art.

Figure 5:
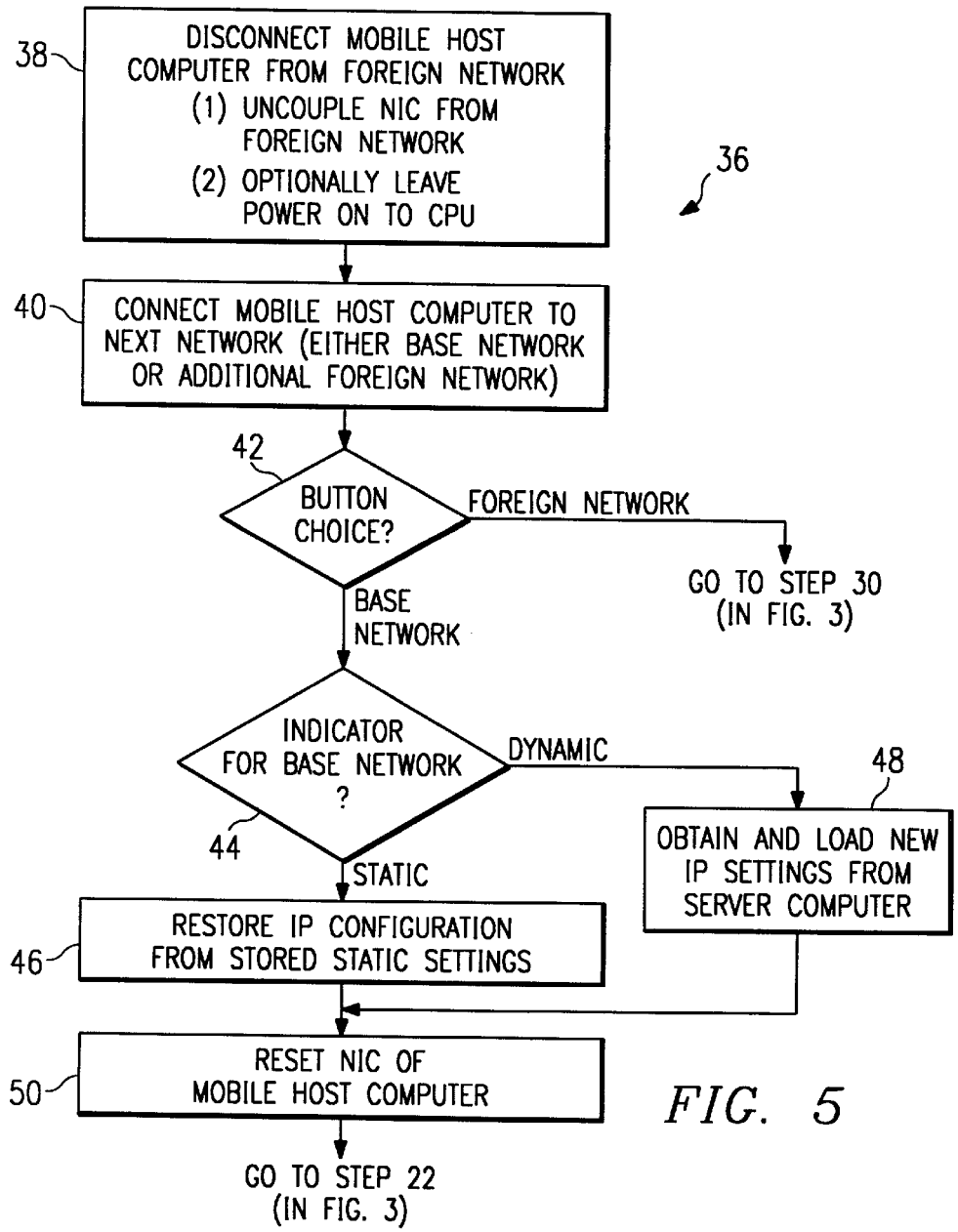
FIG. 5 illustrates a flowchart of the preferred steps of moving a mobile computer from a foreign network to either another foreign network or back to the base network.

FIG. 5 illustrates a flow chart of a method 36 which identifies steps in the preferred embodiment for transporting a computer first coupled to one foreign network to either another foreign network or back to its base network. Thus, method 36 preferably follows the steps set forth in method 16 of FIG. 3, discussed above, but method 36 is set forth in a separate Figure so as to simplify the overall discussion of the present embodiments. Turning then to method 36, in step 38 the user of host computer H3 disconnects the mobile computer from the foreign network. In the preferred embodiment, step 38 is accomplished when the user uncouples the NIC from communicating with the foreign network, such as by physically disconnecting a plug type NIC from the network or, if a radio NIC is used for the communicating to the foreign network, such as by removing the card from the computer which provides radio transmission functionality or by moving the computer with the radio NIC a sufficient distance away from tie radio network so that the radio NIC is no longer within the communication radius of the network. In any event, note that here again FIG. 5 indicates that step 38 may be performed while leaving host computer H3 turned on. Again, therefore, this differs from some prior art DHCP approaches where disconnecting from a DHCP network involves turning off the computer to release the DHCP lease to the computer (assuming a proper shut down of the computer). Under the present embodiment, the computer at issue may remain on while disconnecting it from a foreign network and further while transporting it to, and connecting it to, either another foreign network or back to the base network as appreciated below.

In step 40 the user of host computer H3 connects it to the next network, and again this next network may be either an additional foreign network (i.e., other than network N2) or may be to the base network. As a first part of this step, the NIC of host computer H3 is coupled to communicate with the next network. Once again, this may involve either a physical coupling or the enabling of a radio frequency communication depending on the type of NIC used by host computer H3 for the next network. As a second part of step 40, host computer H3 is configured with the appropriate IP settings to communicate with the next network. This second part is again accomplished again via a program(s) on host computer H3, such that the user of host computer H3 again opens window 26 shown in FIG. 4. Recall from FIG. 4 that window 26 includes two buttons, one indicating a "Connect" to the base network and the other indicating a "Connect" to the foreign network. Therefore, for step 40, the user selects which of the "Connect" buttons is appropriate based on whether the user is returning to his or her base network or moving to another foreign network. Thus, if the user is now connecting host computer H3 back to the base network, then the user clicks the base network "Connect" button on window 26. Conversely, if the user is now connecting host computer H3 to another foreign network, then the user clicks the foreign network "Connect" button on window 26.

In step 42, the program on host computer H3 directs the flow of method 36 based on which of the two "Connect" buttons of window 26 were clicked in step 40. Thus, if the foreign network "Connect" button is clicked, step 42 directs method 36 to step 30 of FIG. 3. On the other hand, if the base network "Connect" button is clicked, step 42 directs method 36 to step 44. Each of these alternative paths is described below.

When step 30 of FIG. 3 is reached following step 42 of FIG. 5, then step 30 again operates in the manner discussed above and thereafter the method continues as shown in FIG. 3, thus proceeding further to step 32. Thus, the reader is referred to the earlier discussion of these steps for greater detail. Briefly, however, note that the flow from step 42 of FIG. 5 to steps 30 and 32 of FIG. 3 once again causes the program on host computer H3 to release the present IP settings and obtain and store a new set of IP settings, and here the settings are allocated to the new foreign network to which host computer H3 is coupled. In this latter regard, the program on host computer H3 preferably issues a DHCP discover command to the new foreign network and, upon receiving a reply (assuming a reply is received), then issues a request command to a server or comparably functioning computer on the new foreign network. Again, the request command is understood as a request for the server computer to assign to host computer H3 one of the IP addresses allocated for the new foreign network. Next, the server computer retunns a reply and acknowledge command to H3, thereby providing the assigned IP address for host computer H3, and may further include any of a subnet mask, a default gateway, and an IP address of one or more machines providing name services, also to be added to the IP configuration of host computer H3. The settings are then entered by the program on host computer H3 into the appropriate locations of host computer H3 so that those settings thereafter may be used to permit host computer H3 to communicate along the new foreign network. Lastly, note that the operation has returned to step 30 of method 16 and, therefore, once again FIG. 3 may be completed and the flow also may continue to FIG. 5 and repeat numerous times for numerous foreign networks. In each instance, therefore, steps 38 and 40 repeat and host computer H3 is re-configured with new IP settings in response each time to a single click of the foreign network "Connect" button on window 26. If eventually host computer H3 is returned to the base network, then as mentioned above step 42 of FIG. 5 directs the flow to step 44 described immediately below.

In step 44, the program on host computer H3 examines the indicator set in step 20 of FIG. 3 to determine the type of protocol assignments for the base network. Recall that those assignments were created either dynamically or statically. If the base network protocol assignment is static, then step 44 directs method 36 to step 46. On the other hand, if the base network protocol assignment is dynamic, then step 44 directs method 36 to step 48. Each of these steps is discussed below.

In step 46, the program on host computer H3 restores the IP settings earlier stored in a persistent storage resource and corresponding to the host computer H3 when it was configured for the base network. In other words, recall that step 29 of FIG. 3 stored these settings in a persistent storage resource so that those settings would not be lost when host computer H3 was re-configured to communicate with a foreign network. Now, however, one skilled in the art will confirm that step 46 is reached only when the mobile host computer (e.g., host computer H3) was originally statically configured with IP settings for the base network, then removed from that network and re-configured for one or more foreign networks, and then re-connected to the base network. As a result, note that by retrieving the stored IP settings (i.e., IP address, and possibly a subnet mask, a default gateway, and an IP address of one or more machines providing name services), step 46 further operates to enters those settings into the appropriate locations of host computer H3 so that those settings thereafter may be used to permit host computer H3 to once again communicate along the base network. Thus, these new settings supersede any settings from the immediately preceding foreign network to which host computer H3 was coupled. Next, method 36 continues to step 50, described below following the discussion of step 48.

In step 48, the program on host computer H3 obtains a new set of IP settings for host computer H3, where those new settings are dynamically obtained by transmitting them along the base network from a DHCP server (or comparable device) to host computer H3. In other words, one skilled in the art will confirm that step 48 is reached only when the mobile host computer (e.g., host computer H3) was originally dynamically configured with IP settings for the base network, then removed from that network and re-configured for one or more foreign networks, and then re-connected to the base network. As a result, note that a new set of dynamically provided IP settings may be obtained and, therefore, step 48 does so and enters those settings into the appropriate locations of host computer H3 so that those settings thereafter may be used to permit host computer H3 to once again communicate along the base network. Like step 46 above, these new settings supersede any settings from the immediately preceding foreign network to which host computer H3 was coupled. Next, method 36 continues to step 50.

Step 50 performs the same operation as step 34 described above and, thus, the reader is referred to the earlier discussion for greater details. Briefly re-stating some of the operation details, in step 50 the program on host computer H3 resets the NIC of host computer H3, such as by re-enumerating the NIC. Consequently, after this step the new IP settings loaded from either step 46 or from step 48 take effect with respect to the configuration of host computer H3. Therefore, host computer H3 is once again operable to communicate along the base network using these settings. Note further that step 50 represents the last step of method 36, and after that step the flow may return to step 22 of method 16 (of FIG. 3). In other words, at this point host computer H3 is once again coupled to communicate with its base network and configured with appropriate IP settings. Thus, host computer H3 may then operate with respect to its base network, and thereafter the steps beginning with step 22 and proceeding onward may once again occur if it is desired to once again transport host computer H3 to one or more foreign networks.

From the above, it may be appreciated that the above embodiments provide numerous advantages over the prior art. For example, when the user of a mobile computer connects to a new network, such as for temporary communications along that network, the user may achieve proper configuration of the computer with the single click of a window button. The present embodiments, therefore, provide such access with minimal action required by the user. Additionally, note that the above examples demonstrate the flexibility of the inventive scope, but are not intended to be exhaustive. Thus, still other options may be presented consistently with the present embodiments. For example, the window input shown in FIG. 4 and which is typically operated in response to the clicking of a pointing device is merely one type of user interface input which may be used to solicit the user's input to re-configure the computer each time it is coupled to a different network. An alternative could include a keyboard input, and/or could be a non-window or non-graphics type of user interface. As another example, while the present embodiments alone permit techniques for simplifying the configuration of a mobile host computer, they may be combined with additional techniques to further improve an environment where a user is constantly moving his or her computer from one network to another. In this regard, note that one of the present inventors provides in another patent still other inventive techniques whereby a transported computer, once coupled to a foreign network, may communicate with a protocol so that the transported computer is able to use computer resources accessible via that network while not requiring the user of the transported computer to manually enter complicated information to configure the computer for such resources. These techniques may be appreciated from U.S. patent application Ser. No. 08/828,866 (Attorney Docket TI-25739), entitled "Computer Network System With Resource Server Computer And Methodology", filed on Mar. 31, 1997, and which is hereby incorporated herein by reference. As still another example of the flexibility of the present embodiments, note that the LiveNet application program is by way of example. For example, only a single button option could be used if it were assumed that movement of the mobile host computer would always be back and forth between a base network and a foreign network rather than accommodating the possibility that more than one foreign network may be connected to the mobile computer in succession. In other words, in this case, a single "Connect" button could replace the scenario of a different "Connect" button for either base or foreign network, and this alternative embodiment could keep track of whether the immediately preceding connection were to either the base network or a foreign network. Additionally, while the WINDOWS 95 operating system has been described above and provides a preferred environment, the present embodiments may likewise apply to other systems as well. Given the above, therefore, one skilled in the art will appreciate that while the present embodiments have been described in detail, various substitutions, modifications or alterations could be made to the descriptions set forth above without departing from the inventive scope which is defined by the following claims.

We claim:

1. A method of configuring a mobile computer among different computer network configurations, comprising:
    connecting the mobile computer to a first network medium, comprising the steps of:
        coupling a network interface circuit of the mobile computer to communicate with the first network medium; and
        configuring the mobile computer to have an IP address allocated for the first network medium;
    after the step of connecting, the steps of:
        performing a program operation on the mobile computer to determine whether a dynamic configuration protocol is available on the first network medium; and
        performing a program operation on the mobile computer to store an indicator in a storage resource of the mobile computer representing whether a dynamic configuration protocol is available on the first network medium;
    after storing the indicator, disconnecting the mobile computer from the first network medium, wherein the disconnecting step comprises uncoupling the network interface circuit of the mobile computer from communicating with the first network medium;
    after the disconnecting step, connecting the mobile computer to a second network medium, comprising the steps of:
        coupling the network interface circuit of the mobile computer to communicate with the second network medium;
        performing a program operation on the mobile computer to request a user interface input; and
        responsive to the user interface input, the steps of:
            performing a program operation on the mobile computer to store the IP address allocated for the first network medium in a persistent storage resource included within the mobile computer if the indicator indicates that a dynamic configuration protocol is not available on the first network medium; and
            performing a program operation on the mobile computer to configure the mobile computer to have an IP address allocated for the second network medium by transmitting along the second network medium the IP address allocated for the second network medium from a server computer to the mobile computer.

2. The method of claim 1 and, after the step of coupling the network interface circuit of the mobile computer to the second network medium, further comprising the steps of:
    first, disconnecting the mobile computer from the second network medium, wherein the first disconnecting step comprises uncoupling the network interface circuit of the mobile computer from communicating with the second network medium; and
    second, connecting the mobile computer to the first network medium, wherein the second connecting step comprises:
        coupling the network interface circuit of the mobile computer to communicate with the first network medium; and
        performing a program operation on the mobile computer to configure the mobile computer to have the IP address allocated for the first network medium by copying the IP address stored in the persistent storage resource.

3. The method of claim 2 wherein the step of performing a program operation on the mobile computer to configure the mobile computer to have the IP address allocated for the first network medium by copying the IP address stored in the persistent storage resource comprises performing a program operation on the mobile computer to configure the mobile computer to have the IP address allocated for the first network medium by copying the IP address stored in the persistent storage resource if the indicator indicates that a dynamic configuration protocol is not available on the first network medium.

4. The method of claim 1 and, after the step of coupling the network interface circuit of the mobile computer to the second network medium, further comprising the steps of:

first, disconnecting the mobile computer from the second network medium, wherein the first disconnecting step comprises uncoupling the network interface circuit of the mobile computer from communicating with the second network medium; and second, connecting the mobile computer to the first network medium, wherein the second connecting step comprises:

coupling the network interface circuit of the mobile computer to communicate with the first network medium; and performing a program operation on the mobile computer to configure the mobile computer to have a new IP address allocated for the first network medium by transmitting along the first network medium the new IP address allocated for the first network medium from a server computer to the mobile computer.

5. The method of claim 4 wherein the mobile computer comprises a central processing unit, and wherein power to the central processing unit is not interrupted between the step of first disconnecting the mobile computer from the second network medium and the step of configuring the mobile computer to have the new IP address allocated for the first network medium.

6. The method of claim 4 wherein the step of performing a program operation on the mobile computer to configure the mobile computer to have a new IP address allocated for the first network medium by transmitting along the first network medium the new IP address allocated for the first network medium from a server computer to the mobile computer comprises performing a program operation on the mobile computer to configure the mobile computer to have a new IP address allocated for the first network medium by transmitting along the first network medium the new IP address allocated for the first network medium from a server computer to the mobile computer if the indicator indicates that a dynamic configuration protocol is available on the first network medium.

7. The method of claim 1:

wherein the step of connecting the mobile computer to a first network medium further comprises configuring the mobile computer to have a subnet mask corresponding to the first network medium;

wherein the step of connecting the mobile computer to a second network medium further comprises, after the step of coupling the network interface circuit of the mobile computer to communicate with the second network medium, and responsive to the user interface input, performing a program operation on the mobile computer to configure the mobile computer to have a subnet mask corresponding to the second network medium by transmitting the subnet mask corresponding to the second network medium from a server computer to the mobile computer;

and further comprising, prior to the step of performing a program operation on the mobile computer to configure the mobile computer to have a subnet mask corresponding to the second network medium and after the step of configuring the mobile computer to have a subnet mask corresponding to the first network medium, performing a program operation on the mobile computer to store the subnet mask corresponding to the first network medium in a persistent storage resource included within the mobile computer if the indicator indicates that a dynamic configuration protocol is not available on the first network medium.

8. The method of claim 7 and, after the step of coupling the network interface circuit of the mobile computer to the second network medium, further comprising the steps of:

first, disconnecting the mobile computer from the second network medium, wherein the first disconnecting step comprises uncoupling the network interface circuit of the mobile computer from communicating with the second network medium; and second, connecting the mobile computer to the first network medium, wherein the second connecting step comprises:

coupling the network interface circuit of the mobile computer to communicate with the first network medium; and performing a program operation on the mobile computer to configure the mobile computer to have the subnet mask corresponding to the first network medium by copying the subnet mask stored in the persistent storage resource.

9. The method of claim 8 wherein the step of performing a program operation on the mobile computer to configure the mobile computer to have the subnet mask corresponding to the first network medium by copying the subnet mask stored in the persistent storage resource comprises performing a program operation on the mobile computer to configure the mobile computer to have the subnet mask corresponding to the first network medium by copying the subnet mask stored in the persistent storage resource if the indicator indicates that a dynamic configuration protocol is not available on the first network medium.

10. The method of claim 1:

wherein the step of connecting the mobile computer to a first network medium further comprises configuring the mobile computer to have a default gateway corresponding to the first network medium;

wherein the step of connecting the mobile computer to a second network medium further comprises, after the step of coupling the network interface circuit of the mobile computer to communicate with the second network medium, and responsive to the user interface input, performing a program operation on the mobile computer to configure the mobile computer to have a default gateway corresponding to the second network medium by transmitting the default gateway corresponding to the second network medium from a server computer to the mobile computer;

and further comprising, prior to the step of performing a program operation on the mobile computer to configure the mobile computer to have a default gateway corresponding to the second network medium and after the step of configuring the mobile computer to have a default gateway corresponding to the first network medium, performing a program operation on the mobile computer to store the default gateway corresponding to the first network medium in a persistent storage resource included within the mobile computer if the indicator indicates that a dynamic configuration protocol is not available on the first network medium.

11. The method of claim 10 and, after the step of coupling the network interface circuit of the mobile computer to the second network medium, further comprising the steps of:

first, disconnecting the mobile computer from the second network medium, wherein the first disconnecting step comprises uncoupling the network interface circuit of the mobile computer from communicating with the second network medium; and second, connecting the mobile computer to the first network medium, wherein the second connecting step comprises:

coupling the network interface circuit of the mobile computer to communicate with the first network medium; and performing a program operation on the mobile computer to configure the mobile computer to have the default gateway corresponding to the first network medium by copying the default gateway stored in the persistent resource storage.

12. The method of claim 11 wherein the step of performing a program operation on the mobile computer to configure the mobile computer to have the default gateway corresponding to the first network medium by copying the default gateway stored in the persistent resource storage comprises performing a program operation on the mobile computer to configure the mobile computer to have the default gateway corresponding to the first network medium by copying the default gateway stored in the persistent resource storage if the indicator indicates that a dynamic configuration protocol is not available on the first network medium.

13. The method of claim 1:
wherein the step of connecting the mobile computer to a first network medium further comprises configuring the mobile computer to have a subnet mask and a default gateway corresponding to the first network medium;
wherein the step of connecting the mobile computer to a second network medium further comprises, after the step of coupling the network interface circuit of the mobile computer to communicate with the second network medium, and responsive to the user interface input, performing a program operation on the mobile computer to configure the mobile computer to have a subnet mask and a default gateway corresponding to the second network medium by transmitting the subnet mask and a default gateway corresponding to the second network medium from a server computer to the mobile computer;
and further comprising, prior to the step of performing a program operation on the mobile computer to configure the mobile computer to have a subnet mask and a default gateway corresponding to the second network medium and after the step of configuring the mobile computer to have a subnet mask and a default gateway corresponding to the first network medium, performing a program operation on the mobile computer to store the subnet mask and a default gateway corresponding to the first network medium in a persistent storage resource included within the mobile computer if the indicator indicates that a dynamic configuration protocol is not available on the first network medium.

14. The method of claim 13 and, after the step of coupling the network interface circuit of the mobile computer to the second network medium, further comprising the steps of:
first, disconnecting the mobile computer from the second network medium, wherein the first disconnecting step comprises uncoupling the network interface circuit of the mobile computer from communicating with the second network medium; and
second, connecting the mobile computer to the first network medium, wherein the second connecting step comprises:

coupling the network interface circuit of the mobile computer to communicate with the first network medium; and performing a program operation on the mobile computer to configure the mobile computer to have the subnet mask and the default gateway corresponding to the first network medium by copying the subnet mask and the default gateway stored in the persistent storage resource.

15. The method of claim 14 wherein the step of performing a program operation on the mobile computer to configure the mobile computer to have the subnet mask and the default gateway corresponding to the first network medium by copying the subnet mask and the default gateway stored in the persistent storage resource comprises performing a program operation on the mobile computer to configure the mobile computer to have the subnet mask and the default gateway corresponding to the first network medium by copying the subnet mask and the default gateway stored in the persistent storage resource if the indicator indicates that a dynamic configuration protocol is not available on the first network medium.

16. The method of claim 1 wherein the user interface input comprises an input signal enabled in response to a pointing device.

17. The method of claim 1 wherein the user interface input comprises an input signal enabled in response to a keyboard.

18. The method of claim 1 wherein the step of coupling a network interface circuit of the mobile computer to communicate with the first network medium comprises physically connecting the network interface circuit to the first network medium.

19. The method of claim 1 wherein the step of coupling a network interface circuit of the mobile computer to communicate with the first network medium comprises activating a radio frequency transmitter/receiver to communicate with the first network medium.

20. The method of claim 1 and further comprising, prior to the step of performing a program operation on the mobile computer to configure the mobile computer to have an IP address allocated for the second network medium by transmitting along the second network medium the IP address allocated for the second network medium from a server computer to the mobile computer, the step of re-enumerating the network interface circuit of the mobile computer.

21. The method of claim 1 and, prior to the step of performing a program operation on the mobile computer to configure the mobile computer to have an IP address allocated for the second network medium by transmitting along the second network medium the IP address allocated for the second network medium from a server computer to the mobile computer, the step of releasing the IP address allocated for the first network medium if the indicator indicates that a dynamic configuration protocol is available on the first network medium.

22. The method of claim 1:
wherein the step of connecting the mobile computer to a first network medium further comprises configuring the mobile computer to have an IP address of a computer providing a name service and corresponding to the first network medium;
wherein the step of connecting the mobile computer to a second network medium further comprises, after the step of coupling the network interface circuit of the mobile computer to communicate with the second network medium, and responsive to the user interface input, performing a program operation on the mobile computer to configure the mobile computer to have an IP address of a computer providing a name service and corresponding to the second network medium by transmitting the IP address of the computer providing the name service to the second network medium from a server computer to the mobile computer;

and further comprising, prior to the step of performing a program operation on the mobile computer to configure the mobile computer to have an IP address of a computer providing a name service and corresponding to the second network medium and after the step of configuring the mobile computer to have an IP address of a computer providing a name service and corresponding to the first network medium, performing a program operation on the mobile computer to store the IP address of a computer providing a name service and corresponding to the first network medium in a persistent storage resource included within the mobile computer if the indicator indicates that a dynamic configuration protocol is not available on the first network medium.

23. A method of configuring a mobile computer among different computer network configurations, comprising:

connecting the mobile computer to a first network medium, comprising the steps of:
  coupling a network interface circuit of the mobile computer to communicate with the first network medium; and
  performing a program operation on the mobile computer to configure the mobile computer to have an IP address allocated for the first network medium by transmitting along the first network medium the IP address allocated for the first network medium from a server computer to the mobile computer;

after the step of connecting, the step of disconnecting the mobile computer from the first network medium, wherein the disconnecting step comprises uncoupling the network interface circuit of the mobile computer from communicating with the first network medium;

after the disconnecting step, connecting the mobile computer to a second network medium, comprising the steps of:
  coupling the network interface circuit of the mobile computer to communicate with the second network medium;
  performing a program operation on the mobile computer to request a user interface input, wherein the user interface input is provided by the user choosing a single interface button; and
  responsive to the single button user interface input, the step of performing a program operation on the mobile computer to configure the mobile computer to have an IP address allocated for the second network medium by transmitting along the second network medium the IP address allocated for the second network medium from a server computer to the mobile computer; and wherein power to the central processing unit of the mobile computer is not disturbed between the step of connecting the mobile computer to the first network medium and the step of performing a program operation on the mobile computer to configure the mobile computer to have an IP address allocated for the second network medium.

* * * * *

UNITED STATES PATENT AND TRADEMARK OFFICE
CERTIFICATE OF CORRECTION

PATENT NO : 5,918,016

DATED : June 29, 1999

INVENTOR(S) : Jason M. Brewer, John C. Linn, Keith L. Perrin, and Robert E. Tonsing It is certified that an error appears in the above-identified patent and that said Letters Patent is hereby corrected as shown below:

On the title page, item [54], and in column 1, line 3:

In the title of the invention, the word "VARING" should instead be --VARYING--.

Signed and Sealed this

Thirtieth Day of November, 1999

Attest:

Q. TODD DICKINSON

Attesting Officer

Acting Commissioner of Patents and Trademarks